United States Patent [19]

Brown et al.

[11] Patent Number: 5,309,143

[45] Date of Patent: May 3, 1994

[54] VEHICLE TURN SIGNAL MALFUNCTION WARNING SYSTEM

[75] Inventors: Albert W. Brown, Albuquerque, N. Mex.; Donald W. Adkins, P.O. Box 87, Mill Valley, Calif. 94942-0087

[73] Assignee: Donald Adkins, Mill Valley, Calif.

[21] Appl. No.: 884,926

[22] Filed: May 18, 1992

[51] Int. Cl.⁵ .............................. B60Q 1/34
[52] U.S. Cl. ..................... 340/475; 340/474; 340/477; 340/457; 340/465
[58] Field of Search .............. 340/475, 477, 474, 457, 340/465, 476

[56] References Cited

U.S. PATENT DOCUMENTS

| | | | |
|---|---|---|---|
| 2,896,190 | 7/1959 | Gallaro et al. | 340/475 |
| 3,445,810 | 5/1969 | Donohoo | 340/457 |
| 3,806,868 | 4/1974 | Portman | 340/475 |
| 4,924,208 | 5/1990 | Coughlin | 340/474 |

Primary Examiner—John K. Peng
Assistant Examiner—Nina Tung
Attorney, Agent, or Firm—Howard Cohen

[57] ABSTRACT

A vehicle turn signal malfunction warning system that alerts the vehicle driver when a turn signal indication is not cancelled after a predetermined time period comprises a modular housing that is plug-compatible with all standardized flasher units in use, requires no wiring to be connected to the turn signal system or to the vehicle electrical system. The system includes a full-wave rectifier connected across the inputs of the standard turn signal flasher, and is powered solely by the voltage derived from the turn signal system. The warning system includes a first time base circuit, a second time base circuit, a gating means, and a tone generator means. The first time base circuit is arranged to be fully charged by the first turn signal pulse through the full-wave rectifier, and to discharge approximately 2.5 seconds after the turn signal pulse train ends. The second time base circuit begins charging when the first time base is fully charged, and accumulates a charge until the first time base circuit resets. The cumulative charge of the second time base circuit is connected through a zener diode to a gate, and thence to an audible transducer. After the turn signal has operated for a predetermined time period, a sufficient number of turn signal pulses will have been generated to raise the voltage of the second time base circuit above the zener diode threshold, the gating means will switch on, and the audible warning will sound. Cancellation of the turn signal indication will immediately stop the audible warning.

4 Claims, 3 Drawing Sheets

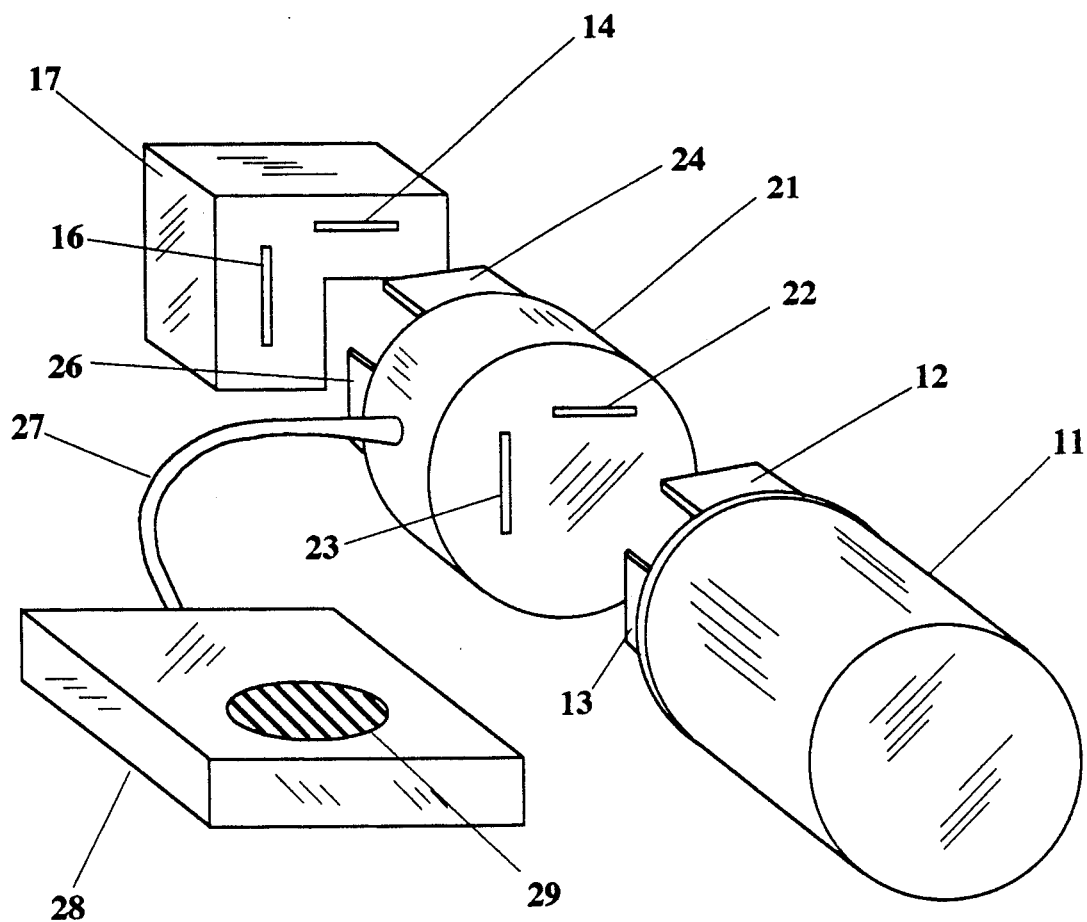
Figure_1

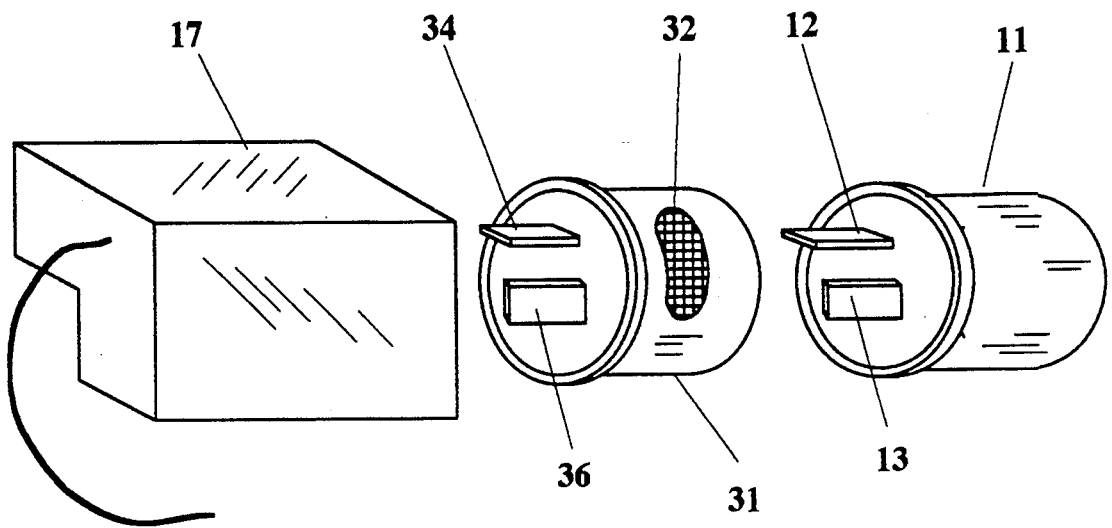
Figure_2
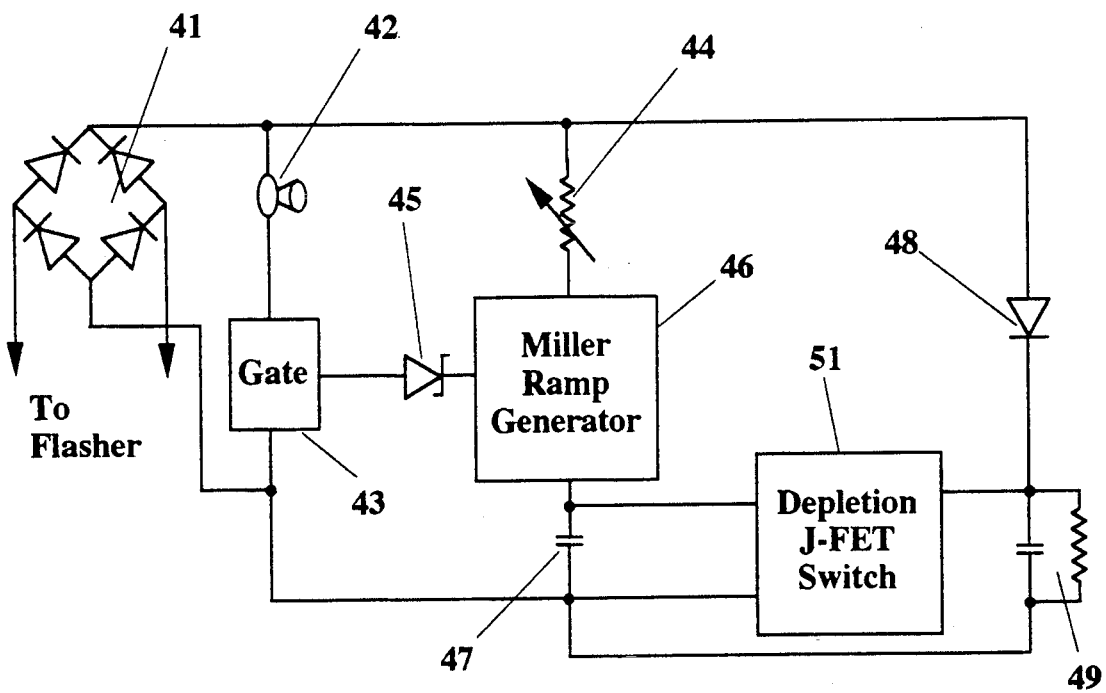
Figure_3

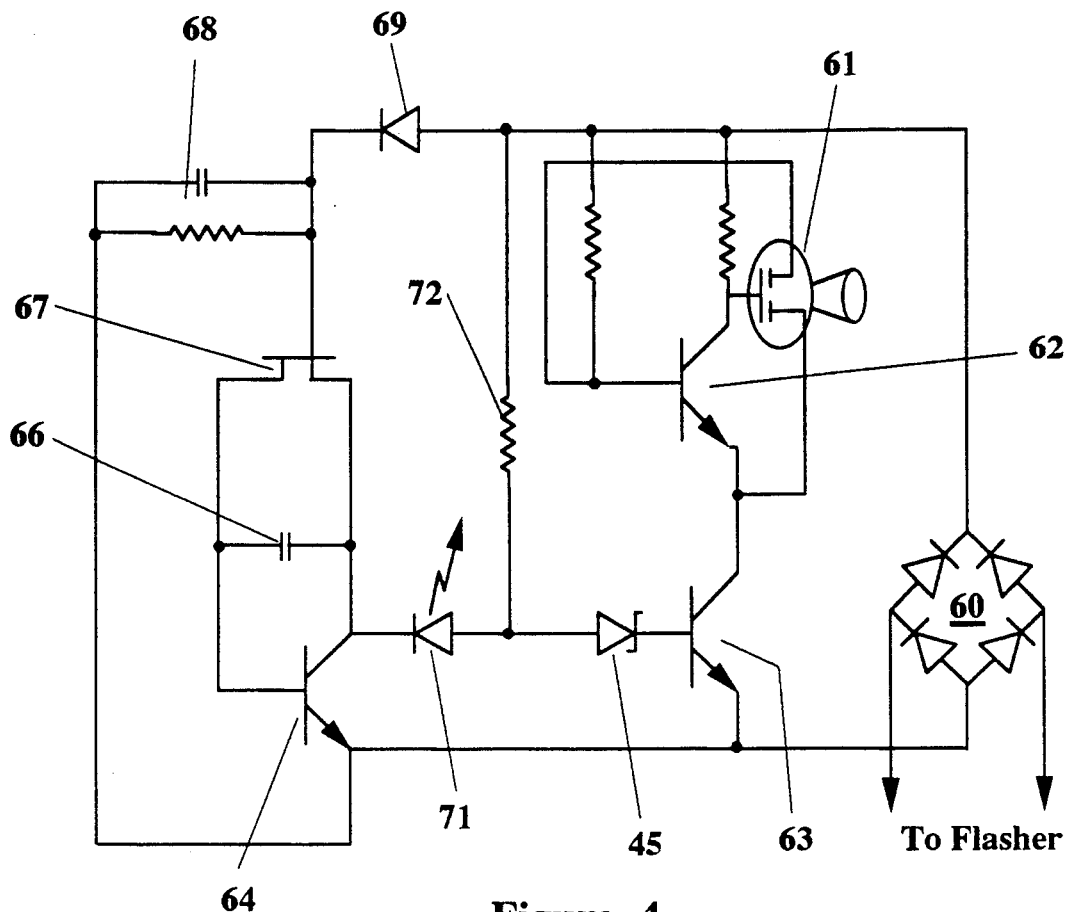
Figure_4
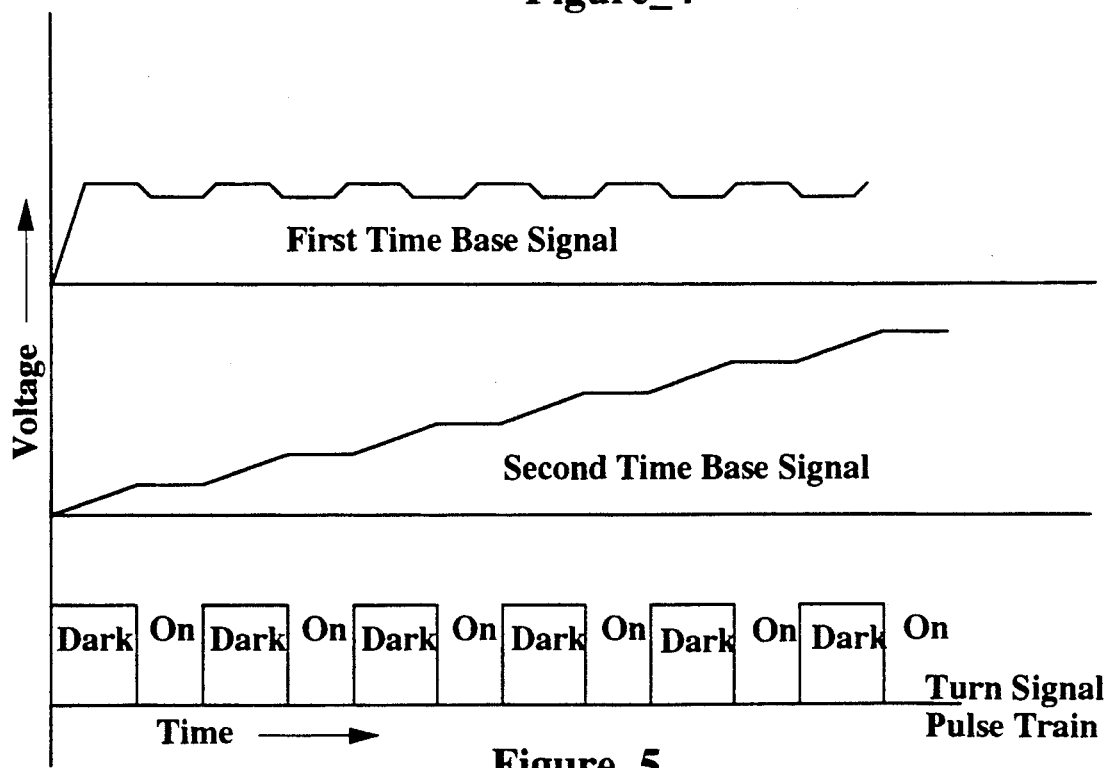
Figure_5

VEHICLE TURN SIGNAL MALFUNCTION WARNING SYSTEM

BACKGROUND OF THE INVENTION

Since 1954 all automobiles manufactured in the United States of America have been equipped with turn signaling means comprising flashing front and rear turn signal lamps. The turn signal circuit includes a thermal circuit interrupting device, a switching means, and indicating lamps at both sides of the front and rear of the exterior of the vehicle. Some vehicles use the brake and parking lamps for this purpose, and others utilize separate lamps. In either case, the circuit interrupting means operates in series with the lamps which are engaged by the signaling switching means.

The circuit interrupting means generally consists of a thermally operated bimetallic switch which is heated by the current of the signaling lamps to open the series circuit and temporarily extinguish the lamps until the switch cools and reestablishes contact. Thus when the interrupter is in the open circuit mode, the lamps are dark and the full battery voltage is present across the terminals of the interrupter, also known as a turn signal flasher unit. The turn signal flasher unit has become a standardized component for each major automotive manufacturer, generally comprising a cylindrical cannister having spade lug connectors which are received in a standardized plug receptacle within the vehicle.

The switching means for most turn signal systems includes a switch wand on the steering column, and a switch which detects rotation of the steering wheel indicative of a turn having been initiated and completed. Thus cancellation of a turn signal indication is generally accomplished automatically.

The driving public has come to rely on the indication of intent to turn or change lanes which is provided by flashing turn signals. A major problem occurs when the turn signal malfunctions and fails to cancel automatically. For example, the steering wheel rotation required to change lanes often may be insufficient to actuate the cancelling mechanism, and the turn indication may be sustained for many miles of highway driving. Although some turn signal systems generate a clicking sound or other audible indication of operation, this sound is often masked by the noise of highway driving, or vehicular audio entertainment systems, or the like.

A sustained turn signal indication that is erroneous may cause surrounding drivers to take actions which are unnecessary and potentially dangerous. For example, consider two oncoming vehicles approaching an intersection. One vehicle exhibits a right turn signal that is caused by a malfunctioning turn signal system, and the other driver intends to turn left. The driver turning left will assume that the oncoming vehicle is turning right, and that the way is clear to make the left turn. However, the oncoming vehicle travels straight through the intersection, and may collide with the left turning vehicle.

U.S. Pat. No. 4,754,256 discloses a audible turn signalling system which emits a click sound from a loudspeaker with each cycle of the flasher unit. This system, and others like it, operate whenever the turn signal operates, not just when the turn system malfunctions or sustains beyond the turn or lane change.

Clearly there is a need for a warning system which will inform the driver of a vehicle that a turn signal indication has not cancelled following a vehicle turn or lane change. It would be advantageous to retrofit existing vehicle turn signal system with such a warning system, and to provide a warning system that may be retrofit with a minimum of installation labor and wiring.

SUMMARY OF THE PRESENT INVENTION

The present invention generally comprises a vehicle turn signal malfunction warning system that informs the vehicle driver when a turn signal indication is not cancelled after a predetermined time period. A salient feature of the invention is that it is plug-compatible with all the standardized flasher units in use, and that it requires no wiring to be connected to the turn signal system or to the vehicle electrical system.

The warning system of the invention includes a full-wave rectifier connected across the input lugs of the standard turn signal flasher, and is powered solely by the voltage derived from the turn signal system. The warning system includes a first time base circuit, a second time base circuit, a gating means, and a tone generator means. When the turn signal is engaged, the flasher unit opens and closes at an interval ranging between 0.3-1.0 second, producing pulses of approximately 12 VDC. The first time base circuit is arranged to be fully charged by the first turn signal pulse through the full-wave rectifier, and to discharge approximately 2.5 seconds after the turn signal pulse train ends. The second time base circuit is arranged to begin charging when the first time base has been fully charged (at the first turn signal pulse), and to accumulate a charge voltage until the first time base circuit resets. The cumulative charge of the second time base circuit is connected through a zener diode to a gating means, and thence to an audible transducer. After the turn signal system has operated for a predetermined time period, a sufficient number of turn signal pulses will have been generated to raise the voltage charge of the second time base circuit above the zener diode threshold, the gating means will switch on, and the audible warning will sound. Cancellation of the turn signal indication will immediately stop the audible warning.

BRIEF DESCRIPTION OF THE DRAWING

FIG. 1 is a perspective view of one embodiment of the vehicle turn signal malfunction system of the present invention.

FIG. 2 is a perspective view of another embodiment of the vehicle turn signal malfunction system of the present invention.

FIG. 3 is a functional block diagram of the electronic circuit of the present invention.

FIG. 4 is a schematic diagram of the electronic circuit of the present invention.

FIG. 5 is a graphic depiction of the turn signal pulse signal and the first and second time base circuit signals of the invention.

DESCRIPTION OF THE PREFERRED EMBODIMENT

With regard to FIG. 1, a typical vehicle turn signalling system generally includes a flasher module 11 having spade lug electrical connectors 12 and 13. The flasher module 11 incorporates a bimetallic thermal switch to reiteratively interrupt the turn signal circuit connected in series through the spade lugs 12 and 13. The spade lugs 12 and 13 are configured to be removably plugged into a receptacle 17 having contact slots 14 and 16 disposed to receive the spade lugs. The contact slots are connected in series to the battery-turn signal switch-turn signal lamps circuit. The components 11-17 are are common in the prior art, and are generally standardized for each vehicle manufacturer.

The present invention generally comprises a vehicle turn signal malfunction warning system that informs the vehicle driver when a turn signal indication is not cancelled after a predetermined time period. It includes a module 21 that contains the circuitry of the invention and is configured to be interposed between the existing turn signal flasher module 11 and the associated vehicle system plug receptacle 17. The module 21 includes contact slots 22 and 23 configured to receive the spade lug contacts 12 and 13 of the flasher module 11, and these contact slots are connected directly to spade lugs 24 and 26 of the module 21 that are configured to be plugged into the contact slots 14 and 16 of the existing plug receptacle 17. Thus the module 21 of the invention permits direct through-connection of the flasher module 11 to its plug receptacle 17 while also establishing a parallel connection to the flasher circuit for the purpose of deriving electrical power therefrom and for detecting prolonged operation of the turn signal flasher system.

The module 21 of the invention is connected through a cable 27 to a transducer housing 28. The housing 28 includes a transducer 29 which emits an audio warning (tone, buzzer, bell, or voice synthesized message) to warn the vehicle operator when the turn signalling system has been in operation for a period of time greater than a preset time limit which is generally indicative of a faulty turn signal indication. The housing 28 may be located within the vehicle at a position which optimizes the opportunity for the vehicle operator to hear the audio warning emitted from the housing.

Alternatively, as shown in FIG. 2, the invention may comprise a module 31 that incorporates all the circuitry of the module 21 as well as an audio transducer 32. The module 31 includes contact slots to receive the spade lugs 12 and 13 of the flasher module 11, and also includes spade lug connectors 34 and 36 which are configured to be received in the contact slots of the existing plug receptacle 17. The embodiment of FIG. 2 provides the same features and advantages as the embodiment of FIG. 1, and is very easy to install. In either embodiment there is no wiring required for installation. Furthermore, the parallel connection established by the module 21 or 31 to the existing turn signalling system does not interfere in any manner with the turn signal operation. Indeed, any malfunction of the invention will not adversely affect the turn signal system, so that the invention enhances vehicle safety while posing no risk to the safe operation of the vehicle.

With regard to FIG. 3, the circuit of the invention generally includes a full wave rectifier 41 that is connected in parallel to the flasher module 11. The voltage across the lugs of the flasher module is zero when the turn signal is operating and the lights are illuminated, and the voltage jumps to the vehicle electrical system voltage (e.g., 12 VDC) when the thermal switch in the module 11 temporarily interrupts the turn signal light circuit. The full wave rectifier produces a pulse train of positive pulses (see FIG. 5) that provides power to the circuit and also serves as a signal indicating a turn indication in progress. The full wave rectifier permits use of the invention with positive ground or negative ground vehicles without modification.

The invention includes a first time base circuit comprising diode 48 connected in series with the RC network 49 and the output of rectifier 41. The RC network 49 is connected to the input of a depletion J-FET switch 51, and the first pulse from the rectifier 41 charges the RC network 49 sufficiently to turn off the switch 51. The network 49 has a discharge time of approximately 2.5 sec. so that it remains charged between turn signal pulses, and the switch 51 remains off, as shown by the first time base signal of FIG. 5.

The second time base circuit of the invention comprises a miller ramp generator 46 connected in series with variable resistor 44 and timing capacitor 47 across the output of rectifier 41. Timing capacitor 47 is also connected across the output terminals of switch 51. When switch 51 is on, capacitor 47 is shorted across the switch terminals, and capacitor 47 carries no charge. However, when the first time base signal goes high and the switch 51 turns off, the capacitor 47 becomes capable of storing a charge. The miller ramp generator reiteratively produces ramp pulses that effectively charge the capacitor 47, raising the voltage on capacitor 47 with each ramp pulse and creating the second timing base signal shown in FIG. 5.

The second timing base signal is also connected through zener diode 45 to gate 43, which is connected in series with an audio transducer 42 across the output of rectifier 41. When the second timing base signal attains a sufficient voltage to exceed the threshold voltage of the zener diode, the zener diode conducts and switches the gate 43, causing the transducer 42 to emit an audio warning to the vehicle operator. It should be noted that the values of resistor 44, capacitor 47, and zener diode 45 can be chosen to establish a predetermined voltage threshold that the second timing base signal must attain to actuate the warning transducer. This threshold voltage corresponds to a predetermined number of turn signal pulses, and that number can be set to be higher than the number of turn signal pulses required for a valid turn indication. Thus the system will generate a warning only when the turn signal system has been operating for an extended period, and required intervention of the vehicle operator to turn off the signal.

When the turn signal is cancelled after the circuit of the invention has been operating and warning the vehicle operator, the turn signal pulse train will cease immediately. There will be no operating power from the rectifier 41 to drive the transducer 42, and the audible warning will cease as soon as the turn signal switch is turned off. Also, the first time base circuit 49 will discharge within a few seconds, the depletion J-FET switch will turn on again, and the second time base circuit capacitor 47 will be shorted and discharged. Thus the circuit will return to its quiescent condition, ready to detect another turn signal event in which the signal is maintained beyond a predetermined time period.

With regard to FIG. 4, a preferred embodiment of the electronic circuit for carrying our the invention includes a full wave rectifier 60 having input terminals connected to the flasher module contact lugs and output terminals which provide the power and signal to drive the circuit. A first time base circuit comprises diode 69 and parallel RC network 68 connected in series across the output of the rectifier 60. The junction of the diode 69 and the RC network 68 is also connected to the gate of depletion J-FET transistor 67, and capacitor 66 is connected across the source and drain of transistor 67. The source and drain are also connected directly to the collector and base of NPN transistor 64.

The RC network 68 is charged by the first pulse output of the rectifier 60. The time constant of the network is approximately 2-3 seconds, so that it retains a charge for a period greater than the switching rate ($\approx 0.3$-1.0 sec) of the flasher module 11. The voltage stored by the network 68 is sufficient to switch off transistor 67, permitting capacitor 66 to retain a charge. Capacitor 66 comprises the second time base circuit, and, together with transistor 64, forms a miller ramp generator. The collector of transistor 64 is connected through light emitting diode 71 to zener diode 45. Resistor 72 is connected between the output of the rectifier 60 and the junction of diodes 71 and 45.

Audio transducer 61 and transistor 62 are configured as a Hartley oscillator connected across the output of rectifier 60. Transistor 63 comprises a gate to switch on and off the Hartley oscillator, the base of transistor 63 being connected to the other terminal of zener diode 45.

Each pulse from the rectifier 60, corresponding to an off period of the flasher module 11 during turn signal operation, causes the miller ramp generator to add to the charge on capacitor 66. When the charge on capacitor 66 exceeds the threshold of zener diode 45 (approximately 5.6 V), the zener diode conducts and turns on the transistor 63. The values of the components 64, 66, 72, and 45 can be chosen so that a predetermined number of turn signal pulses are required to charge the capacitor 66 sufficiently to switch on transistor 63. The actuation of transistor 63 completes the circuit from the rectifier outputs through the Hartley oscillator, and the transducer 61 begins to generate an audio warning signal. It may be appreciated that thereafter each pulse from the rectifier 60 will drive the transducer, so that the audio warning will comprise an intermittent signal repeated during the off time of the turn signal flasher module 11. The audio signal will continue as long as the turn signal indication continues.

When the vehicle operator receives the audio warning signal and cancels the turn signal indication by manually opening the turn signal switch, the circuit to the flasher module is opened, so that no turn signal pulses are presented to the rectifier 60. As a result, the audio warning is immediately stopped. Also, the cessation of input pulses allows the first time base circuit, RC network 68, to discharge within 2-3 seconds and switch on transistor 67. This action shorts and completely discharges capacitor 66, dropping the voltage of the second time base circuit to zero. The circuit thus returns to its quiescent state, ready to operate again when the turn signal is actuated.

It should be noted that the circuit described above is advantageous in that it is simple, compact, and easily assembled. Moreover, all the active devices (transistors and diodes) can be fabricated in silicon with no resistors or capacitors connected therebetween, so that integrated circuit layout and fabrication is economical and greatly simplified. In integrated circuit form, the invention is easily manufactured in a small package that can be placed in a module 21 or 31, as described previously. And, as noted above, no wiring is required to retrofit the invention to an existing vehicle, nor to add the invention to a new vehicle during the manufacturing process.

We claim:

1. In combination with a vehicle having a turn signal system which includes a turn signal flasher module to intermittently pulse at least one turn signal lamp, a warning apparatus for alerting a vehicle operator to prolonged turn signal operation, including;

first time base circuit means for receiving a first pulse from the turn signal flasher module and switching on said warning apparatus and sustaining operation of said warning apparatus for a period longer than the period of the intermittent pulses of the turn signal system;

second time base circuit means for receiving the intermittent pulses from the turn signal flasher module and generating an output signal after a predetermined number of said intermittent pulses from said turn signal flasher module, said second time base circuit being switched on by actuation of said first time base circuit means;

audio writing means for emitting an audible warning to the vehicle operator;

gate means for receiving said output signal from said second time base circuit means and switching on said audio warning means in response to said output signal;

rectifier means connected parallel to said turn signal flasher module for providing said intermittent pulses to said first and second time base circuit means and for providing operating power to said warning means;

said first time base circuit means including a parallel RC network charged by said rectifier means, said parallel RC network having a discharge time constant greater than the period of the intermittent pulses of said turn signal flasher module;

said first time base circuit means including a depletion J-FET switch connected to said parallel RC network, said depletion J-FET switch being switched off by the charge on said parallel RC network.

2. The apparatus of claim 1, wherein said second time base circuit means includes a miller ramp generator switched on by the off state of said depletion J-FET switch, said miller ramp generator connected to receive said intermittent pulses and generate corresponding ramp pulses in response thereto, and capacitor means for receiving said ramp pulses and accumulating an increasing charge in response to said ramp pulses.

3. The apparatus of claim 2, wherein said gate means includes a zener diode connected between said capacitor means and the base of a switching transistor, said zener diode turning on said switching transistor when the charge of said capacitor means exceeds the conducting threshold of said zener diode.

4. The apparatus of claim 1, wherein said apparatus is enclosed in a modular housing means configured to be interposed and connected between said turn signal flasher module and the vehicle with no wire connections.

* * * * *